United States Patent [19]

Reamy

[11] 4,200,130
[45] Apr. 29, 1980

[54] FARRIER'S HAMMER

[76] Inventor: John C. Reamy, 413 W. Pittsburg, Broken Arrow, Okla. 74012

[21] Appl. No.: 899,387

[22] Filed: Apr. 24, 1978

[51] Int. Cl.² .............................................. B25C 1/00
[52] U.S. Cl. ............................................... 145/29 R
[58] Field of Search ...................................... 145/29 R

[56] References Cited

U.S. PATENT DOCUMENTS

| D. 28,662 | 5/1898 | Young | 145/29 R |
|---|---|---|---|
| 177,386 | 5/1876 | Ely | 145/29 R |
| 224,023 | 2/1880 | Mallery | 145/29 R |
| 440,962 | 11/1890 | Pettingell | 145/29 R |
| 932,211 | 8/1909 | Wieland | 145/29 R |
| 1,108,766 | 8/1914 | Leavens | 145/29 R |
| 1,262,515 | 4/1918 | Kingsley | 145/29 R |
| 1,539,265 | 5/1925 | Mitchell | 145/29 R |

FOREIGN PATENT DOCUMENTS 141102  4/1920  United Kingdom ................. 145/29 R

*Primary Examiner*—Othell M. Simpson
*Assistant Examiner*—J. T. Zatarga
*Attorney, Agent, or Firm*—Head & Johnson

[57] ABSTRACT

A hammer for attaching a horse shoe to the hoof of a horse and having a head member at one end for driving the nail through the shoe and a portion of the hoof and a claw member at the opposite end for wringing the projecting end of the nail cleanly at the outer periphery of the hoof and ejecting the severed portion of the nail from the claw.

4 Claims, 11 Drawing Figures

FARRIER'S HAMMER

BACKGROUND OF THE INVENTION

1. Field of the Invention

This invention relates to improvements in hammers and more particularly, but not by way of limitation, to a hammer for driving a nail through a horse shoe and hoof of a horse and cleanly wringing the projecting end of the nail.

2. Description of the Prior Art

In order to secure the usual horse shoe to the hoof of a horse, it is common procedure to drive a nail through the horse shoe and through the outer portion of the hoof. A farrier's hammer is normally utilized for driving the nail, and when the nail has been properly applied, the sharp or pointed outer end thereof normally projects from the hoof and must be removed in order to preclude interference with the walking or running of the horse. This projecting portion of the nail is often cut away through the use of side cutters or other well known cutting tools, but the cut is usually not a clean cut, and a small or rough portion of the nail usually remains on the outer periphery of the hoof. In addition, the outer end of the nail may be bent or otherwise damaged, which makes it difficult to remove the nail when it is necessary to remove the horse shoe for any reason.

SUMMARY OF THE INVENTION

The present invention contemplates a novel hammer for attaching horse shoes to the hoof of a horse and has been particularly designed and constructed for overcoming the foregoing disadvantages. The novel hammer comprises a main body portion having a central aperture or bore extending longitudinally therethrough for securing the hammer head to the usual handle. A head member having a working surface on the outer end thereof is provided on one side of the body for driving the nail through the shoe and hoof in the usual or well known manner. The head member is preferably of an octagonal cross-sectional configuration for facilitating the use of the hammer in the entire shoeing operation, and the working surface is preferably corrugated or roughened to substantially preclude the working surface from slipping off the nail during a hammering operation. A claw member projects outwardly from the main body in an opposite direction from the head member and is of a particular hollow configuration for cooperating with the jaws of the claw to provide a clean and effective wringing of the projecting portion of the nail. In addition, if desired, for quickly and efficiently ejecting the severed portion of the nail from the claw. The novel hammer is simple and efficient in operation and economical and durable in construction.

DESCRIPTION OF THE PREFERRED EMBODIMENTS

Figure 1:
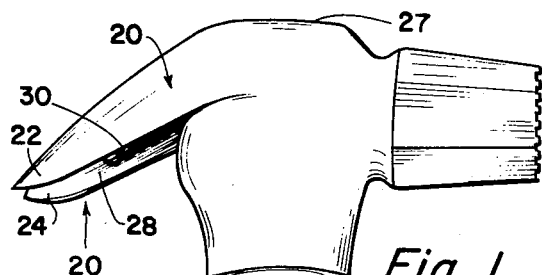
FIG. 1 is a perspective view of a hammer embodying the invention and is taken from the inner side thereof.
Figure 6:
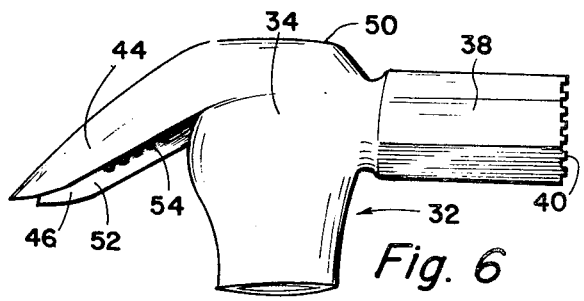
FIG. 6 is a view similar to FIG. 1 illustrating a modified hammer embodying the invention.
Figure 2:
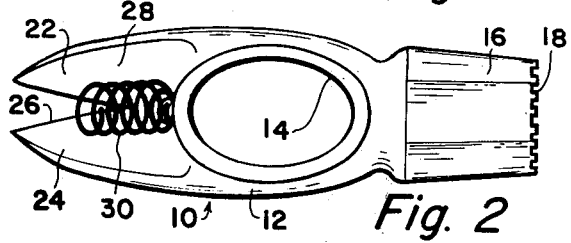
FIG. 2 is a bottom view of the hammer shown in FIG. 1.
Figure 7:
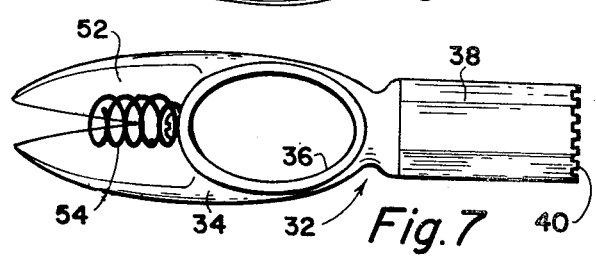
FIG. 7 is a bottom view of the hammer shown in FIG. 6.
Figure 3:
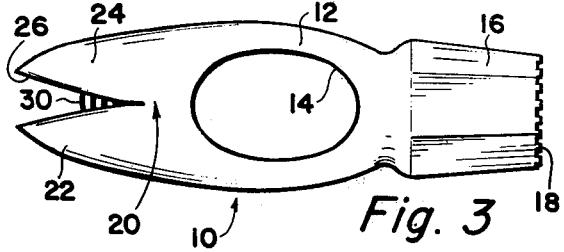
FIG. 3 is a top view of the hammer shown in FIG. 1.
Figure 8:
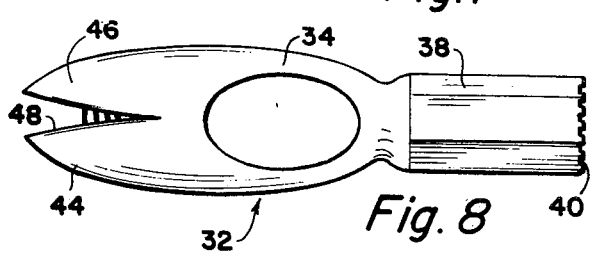
FIG. 8 is a top view of the hammer shown in FIG. 6.
Figure 4:
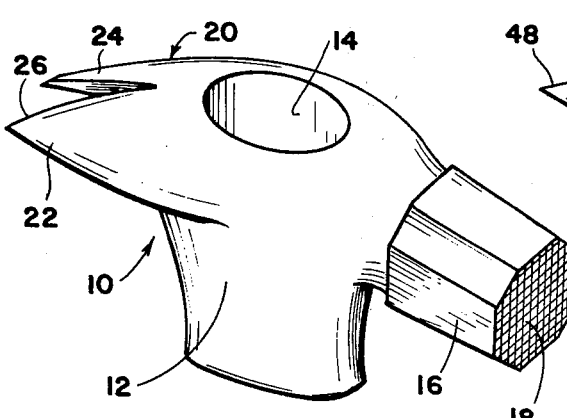
FIG. 4 is a perspective view of the hammer shown in FIG. 1 and is taken from the outer side thereof.
Figure 9:
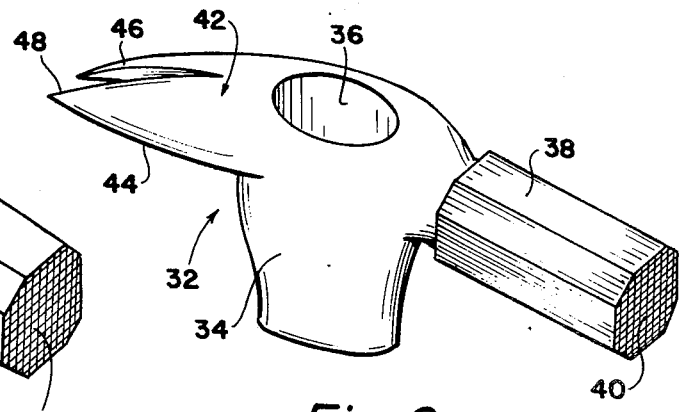
FIG. 9 is a view similar to FIG. 4 illustrating the hammer shown in FIG. 6.
Figure 5:
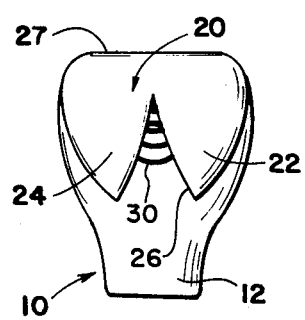
FIG. 5 is an end elevational view of the hammer shown in FIG. 1, illustrating the claw member thereof.

Referring to the drawings in detail, and particularly FIGS. 1 through 5, reference numeral 10 generally indicates a farrier's hammer comprising a main body portion 12 having a bore 14 extending longitudinally therethrough for receiving the usual handle (not shown) therein. A head member 16 extends substantially radially outwardly from one side of the body 12 and is preferably integral therewith, but not limited thereto. The outer surface 18 of the head member 16 is a working surface and is preferably provided with a roughened, corrugated, or double-scored surface for a purpose as will be hereinafter a set forth. In addition, the cross-sectional configuration of the head 16 is preferably octagonal, but not limited thereto. This octagonal configuration assists in clinching a horse with the hammer 10 and which is not possible with a head member having a round cross-sectional configuration.

A claw member generally indicated at 20 extends substantially radially outwardly from the body member 12 in an opposite direction with respect to the head member 16. The claw 20 comprises a pair of diverging claw members 22 and 24 having a substantially V-shaped hiatus 26 therebetween. The hiatus 26 is preferably provided with substantially sharp edges, and the width thereof is preferably carefully selected in accordance with the diametric size of the nails (not shown) with which the hammer 10 is to be used. In addition to extending radially outwardly from the body 12, the claws 22 and 24 are angularly and downwardly disposed with respect to the plane 27 of the top of the body 12 as viewed in FIG. 1. The cross-sectional configuration of the claws 22 and 24 is substantially arcuate, providing a recess or hollow area 28 on the underside of the claws. This configuration facilitates the operation of the claws, as will be hereinafter set forth, and provides clearance for installation or mounting of a suitable helical spring 30 therein, if desired. The spring 30 preferably has one end suitably anchored against the outer periphery of the body 12, and the opposite end thereof freely disposed within the hollow or recess 28 for a purpose as will be hereinafter set forth.

In use, the hammer 10 is suitably secured to the usual handle (not shown) for facilitating manipulation thereof in the usual manner for driving suitable nails (not shown) through the usual horse shoe (not shown) for attaching the horse shoe to the hoof (not shown) of a horse (not shown). The working surface 18 of the head member 16 is impinged repeatedly against the nail head in the usual manner for driving the nail through the horse shoe and hoof. The roughened configuration of the working surface 18 substantially precludes any slippage of the head 16 from the nail during the driving operation, thus greatly reducing the time required for attaching the shoe to the hoof, as well as facilitating the operation.

When the shoe has been properly applied to the hoof, the sharp or pointed outer end of the nail normally protrudes beyond the outer periphery of the hoof, and must be removed. In order to wring the projecting portion of the nail, the claw portion 20 may be disposed against the outer periphery of the hoof with the hiatus 26 between the claws 22 and 24 positioned in such a manner that the projecting portion of the nail is tightly engaged between the walls or edges of the hiatus. The manner 10 may then be manually rotated for moving the sharpened walls or edges of the hiatus 26 circumferentially around the outer periphery of the nail. Simultaneously with this movement, a twisting motion in a direction away from the hoof may be imparted to the claw portion 20. This results in a clean cutting of the nail substantially at the outer periphery of the hoof and removes the nail from the hoof.

If the spring 30 is provided in the hollow or recess 28, the nail positioned in the hiatus 26 will engage the free outer end of the spring and depress it in a direction toward the body 12. As soon as the nail has been severed at the hoof line, the spring 30 will expand and eject the severed nail portion from the hollow or recess 28, thus removing the nail from engagement with the hiatus 26.

Referring now to FIGS. 6 through 10, reference numeral 32 generally indicates a modified ferrier's hammer which is similar to the hammer 10 and comprises a main body portion 34 which may be of a slightly smaller outer configuration than the body 12, but otherwise generally similar thereto. A central bore 36 extends longitudinally through the body 34 for receiving the usual handle (not shown) therein as hereinbefore set forth. A head member 38 extends substantially radially outwardly from the body 34 and is provided with a working surface 40 at the outer end thereof. The working surface 40 is preferably cross-scored or roughened in the same manner as the working surface 18 and for the same purpose. In addition, the cross-sectional configuration of the head 38 is preferably octagonal as is the head 16, in order that the hammer 32 may be utilized for assisting in clinching a horse, if desired. The length of the head member 28 is preferably somewhat longer than the head 16, and the width of the head 38 is preferably somewhat smaller than the head 16, thus resulting in a relatively long, slim-line configuration for the head 38, as clearly shown in the drawings.

A claw portion generally indicated at 42 extends substantially radially outwardly from the body 32 in an opposite direction with respect to the head member 38, and comprises a pair of spaced claw members 44 and 46 having a substantially V-shaped hiatus 48 provided therebetween. The hiatus 48 is generally similar to the hiatus 26 and for the same purpose. However, the maximum width of the hiatus 48 is preferably somewhat less than the maximum width of the hiatus 26, and the overall configuration of the claws 44 and 46 is somewhat narrower and slimmer than the configuration of the claws 22 and 24. In addition, the claws 44 and 46 extend downwardly from the plane 50 at the outer end of the body 34 at a greater angle than the claws 22 and 24 with respect to the plane 28. The edges of the hiatus 48 are preferably sharp, and the cross-sectional configuration of the claws 44 and 46 is substantially arcuate in the same manner as the claws 22 and 24 for providing a hollow or recess 52 on the under side of the claw portion 42. If desired, a suitable helical spring 54 similar to the spring 30 may be installed within the hollow 54 in the same manner and for the same purpose as the spring 30.

In use, the hammer 32 may be manipulated in the same manner as the hammer 10. The overall differences in the configuration of the hammer 32 with respect to the hammer 10 may be selected in order to perform more efficiently with different size nails, horse shoes, and the like. For example, the hammer 10 may be considered an all purpose hammer whereas the hammer 32 may be considered a race track hammer.

Figures 10, 11:
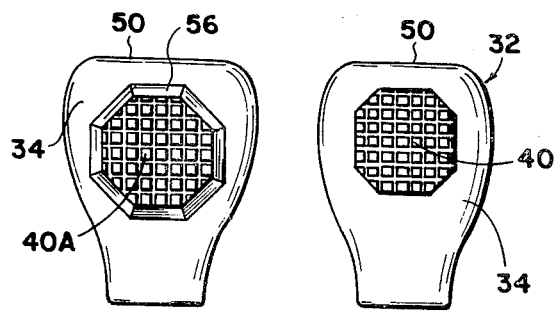
FIG. 10 is an end elevational view of the hammer shown in FIG. 6 and illustrating the working surface thereof.
FIG. 11 is a view similar to FIG. 10 illustrating a modified working surface.

Referring now to FIG. 11, a modified working surface 40A is shown which may be utilized with the hammer 32 in lieu of the working surface 40 (or with the hammer 10 in lieu of the working surface 18). The outer periphery of the working surface 40A is provided with an inwardly directed bevel 56 which extends in a direction toward the body 34. This beveled configuration may be found to produce a more efficient action during the driving of a nail through the horse shoe and hoof.

From the foregoing it will be apparent that the present invention provides a novel farrier's hammer which is particularly designed for facilitating the driving of a nail through a horse shoe and horse hoof, and for wringing the protruding portion of the nail from the outer periphery of the hoof in a clean manner. The hammer head is provided with a roughened or cross-scored working surface which is substantially eliminates slippage of the working surface during a nail driving operation, and the claw portion is provided with a particularly configured hiatus which wrings the nail projection in a manner for producing a clean area surrounding the nail at the outer periphery of the hoof. In addition, a spring may be provided for quickly ejecting the severed portion of the nail from the claw portion, if desired. The novel ferrier's hammer quickly and efficiently drives the nail for attaching the shoe to the hoof and cleanly and rapidly wrings the projecting portion of the nail from the outer periphery of the hoof.

Whereas the present invention has been described in particular relation to the drawings attached hereto, it should be understood that other and further modifications, apart from those shown or suggested herein, may be made within the spirit and scope of this invention.

I claim:

1. A farrier's hammer for attaching a horse shoe to a horse hoof and comprising main body means having a head member extending outwardly therefrom in one direction and a claw portion extending outwardly therefrom in a second direction, a roughened working surface provided on the outer end of the head member for facilitating driving a nail through the horse shoe and horse hoof, said claw portion having a pair of claw members spaced apart by a hiatus of substantially V-shaped configuration for receiving a projecting end of the nail therein, the said claw members being provided with a recess on the inner side thereof for cooperation with the hiatus for wringing of the projection portion of the nail from the horse hoof, and including helical spring means disposed in said recess and having one end thereof anchored against the main body means and the opposite end thereof free for facilitating ejecting of the severed nail portion subsequent to a wringing operation.

2. A farrier's hammer as set forth in claim 1 wherein the edges of the hiatus are substantially sharp for facilitating the wringing of the projecting portion of the nail.

3. A farrier's hammer as set forth in claim 1 wherein the cross-sectional configuration of the head member is substantially octagonal.

4. A farrier's hammer as set forth in claim 1 wherein the claw portion extends outwardly at an angle from the main body means for facilitating disposition of the claw portion adjacent the outer periphery of the hoof during a wringing operation.

* * * * *